United States Patent [19]

Hofstadter et al.

[11] 3,714,057

[45] Jan. 30, 1973

[54] IODIDE ACTIVATED THALLIUM CHLORIDE SCINTILLATOR

[75] Inventors: Robert Hofstadter, Stanford, Calif.; Gerald R. Kramer, Cleveland Heights, Ohio; Mohammed R. Farukhi, Cleveland, Ohio; King H. Rosette, Twinsburg, Ohio

[73] Assignee: Kewanee Oil Company, Bryn Mawr, Pa.

[22] Filed: Nov. 12, 1969

[21] Appl. No.: 876,112

[52] U.S. Cl........252/301.4 R, 250/71.5 R, 250/83 R
[51] Int. Cl..........C09k 1/06, G01t 1/10, G01t 1/202
[58] Field of Search...............252/301.4 R; 250/71.5

[56] References Cited

UNITED STATES PATENTS 2,585,551   2/1952   Hofstadter......................252/301.4 R

OTHER PUBLICATIONS

Hofstadter II, Thallium Halide Crystal Counter–Physical Review, Vol. 72, No. 11, Dec. 1, 1947, pp. 1120–1121.

Levin et al., Phase Diagrams Ceramists, 1964 and 1969 supplement Diagrams 1620 and 3532.

Primary Examiner—Robert D. Edmonds
Attorney—John P. Hazzard

[57]    ABSTRACT

A new high Z scintillator capable of generating light radiation upon exposure to nuclear radiation such as gamma rays, beta rays, protons, mesons, X-rays, etc. wherein said scintillator is transparent to said light radiation and consists of a major amount of thallium chloride and a minor amount of an iodide containing compound.

4 Claims, No Drawings

IODIDE ACTIVATED THALLIUM CHLORIDE SCINTILLATOR

The present invention relates to radiation responsive elements and more particularly to scintillation elements effective to produce light radiation in response to the excitation thereof by other radiation such as gamma rays, beta rays, protons, mesons, X-rays, or the like.

Scintillator elements are useful as components of radiation detectors. In such detectors, the scintillator unit may be a crystal mounted in the detector in such a way as to be readily exposed to and interposed in the paths of radiations of the type to be detected. The scintillator responds to particles of such exciting radiation to produce scintillations which are flashes of light, each time such a particle penetrates the scintillator. In many of these detectors, the scintillator is coupled through some high efficiency light transferring medium or components, to a photomultiplier tube which responds, in turn, to the light flashes to produce corresponding electrical output pulses. The pulses thus are an indication of the exciting particles of radiation.

Because of the remarkable effectiveness and versatility afforded by radiation detection in many fields of search and investigation, these radiation detectors must be capable of producing accurate results in many different uses and many different environments. In cases wherein an indication of the number of radiation particles exciting a scintillator is sought and the rate of such excitation is very high, it is important that the scintillator have a short decay time. That is to say, the time from the beginning of a scintillation to its termination must be very short so that the scintillator has a minimum of time-overlapping scintillations. This is important because the overlapping scintillations would be regarded as one scintillation by the detector. Therefore, an erroneous indication of radiation intensity would be produced.

Another important characteristic of such scintillator is its ability to produce an intense scintillation, or, stated otherwise, have a good pulse height. The light produced by a scintillation may be too low in intensity to withstand the absorption of it in its traverse of the crystal and light coupling elements to the photoresponsive element of a photomultiplier tube whereby it fails to excite the tube appropriately and is thus lost, and an erroneous count is produced. Also, because of the electrical "noise" produced within the photomultiplier tube itself, it is important that the desired scintillation and consequent electrical signal stand out prominently so as to be discernible from the "noise" so created.

Because photoresponsive elements of photomultiplier tubes have different responses to different wave lengths or color of impinging light, it is desirable in a radiation detector that a scintillator produce strongly that wave length or light which is most effective upon the photomultiplier tube if no other advantages are sacrificed.

A further extremely important characteristic of a scintillator is that it has a high as possible absorptivity for radiations. The greater the absorptivity of the crystal, the smaller the crystal need be. This aspect of a scintillator is most important where radiation detectors must be placed in a confined space and this small size facilitates such operation since the smaller crystal enables a smaller detector to be used. Typical needs would include space flight programs, medical applications, and the like. In addition to the size consideration, crystals of higher absorptivity also have a greater "stopping power" and will more fully convert radiations of higher energy content completely to a scintillation or light flash, whereas, a crystal of less absorptivity of the same size would not completely capture the energy of the radiation and thus, only partially, convert said energy to a light flash. The comparative absorptivity of "stopping power" follows the following formula for low energy gamma rays (<1MEV):

Comparative absorptivity $$= \left(\frac{\text{density}_1}{\text{density}_2}\right) \times \left(\frac{\text{atomic number}_1}{\text{atomic number}_2}\right)^5$$

wherein $_1$ refers to stated values for one element being compared to a second element designated by $_2$. For radiation with energies above 1MEV the above formula holds when the atomic number ratio is squared rather than be raised to the fifth power.

From this equation it is readily obvious that the higher the density of a scintillator the greater will be its "stopping power." However, more importantly, the higher the atomic number of this scintillation material the greator will be the "stopping power" thereof. For particle energy loss as distinguished from gamma ray energy loss, the high Z is associated with smaller energy absorptivity and not larger energy absorptivity.

In addition to the foregoing, because of the many environments in which radiation detectors are employed, it is important in many cases that the scintillation components as well as other parts be hardy, and durable and able to withstand vibration, shock and wide temperature variations. Machinability and resistance to cleavage are advantages in forming and utilizing the scintillation crystal. A relatively non-hygroscopic/scintillator is likewise advantageous in obviating special equipment and precautions to exclude moist ambient temperatures.

Secondly, it is an object of the instant invention to provide an improved scintillation crystal having short decay time, good pulse height, and produces wave lengths of light to which photomultiplier tubes are most responsive.

It is another object of the instant invention to provide scintillation crystal that are non-hygroscopic, hardy and durable and able to withstand wide temperature variations especially extremely low temperatures, without injury thereto.

Pursuant to the foregoing objects and in accordance with the instant invention, a novel and improved scintillation crystal incorporating the above mentioned desirable characteristics and being without the mentioned disadvantages is provided by the activation of the thallium chloride (TlCl) with iodide ion in solid solution therewith. Thallium chloride itself, does not scintillate when bombarded at room temperature with radiation such as gamma rays, beta rays, X-rays or the like. Only after activation is it responsive to such radiation. Thallium chloride is a cubic crystal possessing good mechanical and thermal shock resistance, has high density and has the highest atomic number of any scintillation material known to date. Since the scintillation crystal of the instant invention is predominantly thallium chloride, these desirable characteristics carry over into the activated thallium chloride crystal to produce the desired improved results. In the preparation of the activated thallium chloride crystals according to the instant invention, the well known crystal preparation and growing procedures, such as the Kryopoulos furnace (see Z. Phys. Chem. 92, 219), or Stockbarger furnace (see U.S. Pat. No. 2,149,076), may be employed. The crystals may be grown from a melt starting with ultra pure thallium chloride to which is added an iodide containing material which will be discussed in detail later in the specification.

As indicated previously, scintillation crystals of the instant invention are predominantly thallium chloride. The amount of activator present can vary rather widely depending, of course, on the form in which the activator is inserted into the crystal lattice of the thallium chloride. In general, however, the activator material comprising essentially the iodide ion may be present from about 0.005 mole percent to the solubility limit of the dopant, but usually less than approximately 15 mole percent. The upper limit of the activator content of the scintillator depends solely on the effect of the activator on the color or transparency of the finished crystal. Since some iodide compounds are more colored than others, the more colored materials must, of necessity, be used in lesser amounts so as not to adversely effect the transparency of the scintillation crystal with respect to the light flashes produced when said crystal is subject to radiation.

The exact mechanism for activating thallium chloride so that it becomes a scintillation crystal is not known. All that appears to be necessary based on experimental results, is that iodide ion be entrapped in the crystal lattice of the thallium chloride. Iodine itself may be used to supply the needed iodide ion; however, under the growing conditions for producing these scintillation crystals it is most difficult to get iodide ions entrapped in the finished crystal from this source since free iodine is volatile and such iodine must react with a cation present in the material to form the necessary iodide ion. Therefore, the iodide needed is more conveniently inserted by mixing the appropriate amounts of an iodide compound with the pure thallium chloride prior to melting and the formation of the crystal. The iodide can be hooked up with any cation and the cation need not be present in stoichiometric concentration, although such would normally be present in approximately stoichiometric concentration. The quantity of said activator as mentioned previously should at least be 0.005 mole percent and generally should preferably not exceed 5 mole percent. Of course, such iodide compounds that highly color the host crystal should be at lesser concentrations so as not to produce an undesirable color in the final scintillation crystal which would detrimentally effect the transparency thereof. Typical compounds for inserting the iodide ion into the thallium chloride crystal include the iodides of lithium, magnesium, barium, zirconium, chromium, copper, silver, europium, thallium, bismuth, antimony, boron, phosphorus and ammonium. This listing is merely illustrative and is not intended to be limited as any cation can be used as a vehicle to insert the iodide into the thallium chloride crystal so long as it does not adversely affect the transparency of the scintillation crystal.

Furthermore, the iodide ion can be supplied in the form of iodine or an iodide compound and the cation can be supplied in the form of metal or compounds thereof, such as chlorides.

Numerous activated thallous chloride scintillators have been made in accordance with the instant invention. Each of the examples given in the following table by loading a pyrex or quartz test tube with 24.0 grams pure thallous chloride. The indicated amounts of dopant given in the table were then added and mixed thoroughly with the thallous chloride in the test tube. One or more of the test tubes were placed into a controlled atmosphere, Stockbarger type furnace having upper and lower chambers with an opening therebetween and an elevator for supporting the test tubes containing the thallous chloride, the elevator being operable to move the test tubes between the chambers. The test tube or test tubes are mounted on the elevator with the lower extremity of the test tube at the opening of the lower chamber and extending into the upper chamber. The furnace is evacuated to a pressure of approximately 1 micron. After evacuation of the furnace, it is filled with an inert atmosphere of either nitrogen or argon. In most of the examples given in the following table, the furnace temperature was raised to approximately 200°C prior to evacuation. This procedure was followed wherein the dopants remained solids at that temperature. If in examples such as example number 4 wherein iodine was used as a dopant, the evacuation of the furnace and the insertion of an inert atmosphere therein was done at room temperature to avoid loss of the iodine. The temperature of the furnace was then raised to about 480°C which is approximately 50° above the melting point of thallous chloride. Sealing the container is also effective in retaining all dopants if care is exercised to remove moisture and avoid the hazards of excessive pressure being built up in the furnace. The heating was continued until the furnace temperature becomes stable. This required a period of from 5—6 hours after the furnace temperature becomes constant. At this point the charge in the test tubes are completely in the molten state. The lower chamber of the furnace is held at approximately 280°C. The temperature gradient between the two chambers was 200°C over 4 inches vertical height and the solidification point of the melt was midway in said 4 inch span. The test tubes are then lowered by the elevator from the upper chamber at the rate of 1 to 1½ millimeters per hour. After growing said crystal, it is then annealed by lowering its temperature to room temperature at a rate of approximately 6°C per hour.

Each of the crystals given in the following examples were effective scintillators with peak heights sufficient to be ascertained from a C31000D R.C.A. photomultiplier tube output operating at 1,700 volts negative. In the following table RPH% indicates relative peak heights with respect to the peak heights of thallium activated sodium iodide, a widely accepted standard. Cesium 137 (0.662 MEV) was utilized as the gamma radiation source and the measurements were made with the crystals at room temperature.

| EXAMPLE NUMBER | DOPANT No. 1 MOLE % | DOPANT No. 2 MOLE % | RPH % |
|---|---|---|---|
| 1 |  |  | No pulses |
| 2 | .03 AgI |  | 0.82 |
| 3 | .1 AfI |  | 0.55 |
| 4 | .3 Be | .2 I$_2$ | 1.64 |

| Ex | Dopant 1 | Dopant 2 | Value |
|---|---|---|---|
| 5 | .1 BiI$_3$ | | 1.15 |
| 6 | .1 CaCl$_2$ | .2 TlI | 0.82 |
| 7 | .03 CdI$_2$ | | 1.29 |
| 8 | .1 CdI$_2$ | | 1.09 |
| 9 | .1 CoCl$_2$ | .1 NH$_4$I | 0.62 |
| 10 | .1 CrCl$_3$ | .2 NH$_4$I | 1.22 |
| 11 | .1 CsI | | 0.62 |
| 12 | .03 CuCl | .1 TlI | 0.82 |
| 13 | .1 CuCl | .1 TlI | 0.82 |
| 14 | .1 CuI | .1 NH$_4$I | 0.68 |
| 15 | .05 CuI | | 0.82 |
| 16 | .1 CuI | | 1.09 |
| 17 | .2 CuI | | 0.96 |
| 18 | .4 CuI | | 0.82 |
| 19 | .1 DyBr$_3$ | .1 NH$_4$I | 0.48 |
| 20 | .05 HgI$_2$ | | 1.22 |
| 21 | .15 HgI$_2$ | | 0.41 |
| 22 | .03 KI | | 0.55 |
| 23 | .1 KI | | 0.55 |
| 24 | .05 LiCl | .1 NH$_4$I | 0.96 |
| 25 | .1 LiCl | .1 NH$_4$I | 0.55 |
| 26 | .1 NH$_4$I | | 0.44 |
| 27 | .1 NiCl$_2$ | .1 NH$_4$I | 0.96 |
| 28 | .1 RbI | | 0.75 |
| 29 | .05 SbCl$_3$ | .1 NH$_4$I | 0.96 |
| 30* | .4 Be | .1 CuI | 1.34 |
| 31* | .3 Be | .03 HgI$_2$ | 1.43 |
| 32* | 1.0 Be | .2 NH$_4$I | 1.70 |
| 33 | .5 Be | .3 NH$_4$I | 1.75 |
| 34 | 2.5 Be | .3 TlI | 2.49 |
| 35 | 1.2 Be | .24 TlI | 2.10 |
| 36 | 2.5 Be | .5 TlI | 2.15 |
| 37 | 2.5 BeO | .3 TlI | 2.32 |
| 38 | .3 BiI$_3$ | | 1.56 |
| 39 | .6 BiI$_3$ | | 1.38 |
| 40 | .02 CdI$_2$ | | 0.76 |
| 41 | .1 GdI$_3$ | | 1.42 |
| 42 | .3 NH$_4$I | | 1.70 |

* 0.1 I$_2$ also added as a dopant in Examples 30, 31 and 32.

footnote: The procedure for Examples 34 thru 37 varied from that given prior to the list of examples in that a pretreatment of the ingredients was effected prior to growing the crystal. In Examples 34 and 37, dopant No. 1 was first added to the thallous chloride and the two materials were then melted. This melt then had HCl gas bubbled thru it for a short period. After cooling the melt, dopant No. 2 was added and further treatment was the same as given for all crystals. Example 35's pretreatment involved contacting dopant No. 1 in ethanol with HCl gas and then adding the thallous chloride and dopant No. 2 and proceeding with the normal crystal growing steps. Example 36 was similar to procedure of Example 35 except that prior to the addition of dopant No. 2, dopant No. 1 which had been treated with HCl in ethanol was mixed with thallous chloride, melted and had HCl bubbled therethru. After cooling dopant No. 2 was added thereto.

For comparison purposes, a standard cesium iodide sodium activated scintillation crystal mounted has a relative peak height of 80.70 percent, a standard potassium iodide thallium activated crystal mounted has a RPH of 21.0 percent and a selected barium fluoride crystal mounted has a RPH of 6.00 percent. All RPH values given in the above examples are well above the single electron peak and noise of the system utilized in making the measurements.

The scintillators of the instant invention produce visible light which has an emission peak in the range of 4,600 to 4,800 angstroms and possess short decay times.

We claim:

1. A scintillator consisting essentially of a transparent optically integral crystalline material consisting essentially of thallium chloride having 0.005 to 5 mole percentage of an iodide ion included therein.

2. A scintillator according to claim 1 wherein the iodide ion is entrapped within the lattice of the thallium chloride crystal.

3. An optically integral crystal possessing the capability of emitting detectable scintillation having a wave length coming within the range of between 4,600 and 4,800A produced by heating a mixture consisting essentially of thallium chloride containing at least an activating amount but less than 5 mole percent of iodide ion to form a liquid in a first zone, slowly withdrawing the mixture from the first zone into a second zone maintained at a temperature below the melting temperature of the mixture to solidify the same into a crystal and slowly annealing and cooling the solidified crystal to room temperature.

4. The crystal of claim 3 produced by withdrawing the mixture from the first zone to the second zone at a rate of about 1 to 1½ millimeters per hour.

* * * * *